(12) United States Patent
Kuo et al.

(10) Patent No.: US 8,736,622 B2
(45) Date of Patent: May 27, 2014

(54) SYSTEM AND METHOD OF LEVERAGING GPU RESOURCES TO ENHANCE PERFORMANCE OF AN INTERACT-ABLE CONTENT BROWSING SERVICE

(75) Inventors: Jung Chang Kuo, Taipei (TW); Wei Hao Peng, New Taipei (TW)

(73) Assignee: Ubitus Inc (TW)

( * ) Notice: Subject to any disclaimer, the term of this patent is extended or adjusted under 35 U.S.C. 154(b) by 195 days.

(21) Appl. No.: 13/313,246

(22) Filed: Dec. 7, 2011

(65) Prior Publication Data
US 2013/0147818 A1 Jun. 13, 2013

(51) Int. Cl.
*G06F 13/14* (2006.01)
(52) U.S. Cl.
USPC .......................................................... 345/520
(58) Field of Classification Search
None
See application file for complete search history.

(56) References Cited

U.S. PATENT DOCUMENTS

| | | | |
|---|---|---|---|
| 6,803,909 B2* | 10/2004 | Tsukahara | 345/419 |
| 2005/0012753 A1* | 1/2005 | Karlov | 345/538 |
| 2009/0102838 A1* | 4/2009 | Bullard et al. | 345/419 |
| 2009/0189890 A1* | 7/2009 | Corbett et al. | 345/419 |
| 2010/0007646 A1* | 1/2010 | Tsuei et al. | 345/212 |
| 2011/0072056 A1* | 3/2011 | Bakalash et al. | 707/812 |

\* cited by examiner

*Primary Examiner* — David Zarka
*Assistant Examiner* — Khoa Vu

(57) ABSTRACT

A system and a corresponding method of leveraging GPU resources to enhance performance of the interact-able content browsing (ICB) service are to utilize the computation capacity of the GPU of the graphics card to share the computation load originally taken by the CPU. The raw images depicted by the browser application program executed in the server can be directly retrieved from the VRAM of the graphics card by the encoder inside the GPU to be further encoded and streamed before being forwarded directly to distant clients. Thereby, work load and bus bandwidth occupation on the CPU can be greatly reduced, the number of clients that can be served simultaneously by a single server can be increased, and the related power consumption can be substantially reduced.

8 Claims, 8 Drawing Sheets

SYSTEM AND METHOD OF LEVERAGING GPU RESOURCES TO ENHANCE PERFORMANCE OF AN INTERACT-ABLE CONTENT BROWSING SERVICE

BACKGROUND OF THE INVENTION

1. Field of the Invention

This invention relates to a system and a method of leveraging GPU (Graphics processing unit) resources to enhance performance of an interact-able content browsing (ICB) service, and more particularly to the system and the method for enhancing the performance of an interact-able content browsing service that can introduce the GPUs to directly capture, encode and stream raw images in memory of a display card so as to save the operational bandwidth of the central processing unit (CPU).

2. Description of the Prior Art

In a cloud based service system, for example (but not limited to) a system for providing a cloud based web browsing and/or application service, a typical job of a server therein is to deliver web based content or other kinds of contents to clients at far ends. When the content to be delivered contains video data, raw images related to the content shall be encoded in advance at the server end into a video stream, before such content can be transmitted to specific clients and can be presents at displayers of the clients in a web form or other formats. Particularly, in the case while more than one client intends to capture the video content from a single cloud based service system at the same time, jobs of encoding the raw images and stream-transferring the encoded data between the GPU and the CPU would occupy huge workable bandwidths of the system resources and the CPU which can be originally applicable to application programs. Such an arrangement would inevitably limit the cloud based service and also the number of clients accessing the system simultaneously. Further, for those cloud based services with almost the same capacity, the power consumption will also be an issue.

Referring to FIG. 1, a typical cloud based service system 1 is illustrated in a block form. The cloud based service system 1 can perform the cloud based network application and web browsing service to provide data to a data center in accordance with the following structuring.

1. Display 111: to display a plurality of raw images at display peripherals by executing the browser application program at the server ends 11 of the cloud based service system 1 through performing the application programming interface (API) of the operating system (OS);

2. Encode 112: to capture the raw images displayed at the display peripherals and to transfer the captured raw images to a hardware or software encoder for further encoding and streaming;

3. Stream 113: to capture the streamed data from the encoder for being further distributed to the distant client ends 91 through the network facilities 14.

As shown in FIG. 1, the browser application program performed individually by the servers 11, 12 or 13 of the cloud based service system 1 can only provide service to a single client 91, 92 or 93 once at a time. If a need to enlarge the service capacity of the system 1, cost hike in increasing the number of the servers would be too high to be accepted.

Referring to FIG. 2, another typical cloud based service system 2 is shown in a block form. The system 2 performs the following operations to provide the cloud based network application and browsing services.

1. Program 211: a server 21 of the cloud based service 2 can execute a plurality of application programs 211 and 212. Each of the programs 211 or 212 can individually form a respective program-executing environment to provide the distant client 91 or 92 to obtain the service of the server 21 through the network facilities 14.

2. Memory 2111: the browser application program executed by the server 21 of the cloud based service system 2 can depict a plurality of raw images displayed at the display peripherals through the application program interface of the operation system. The raw images are further stored in the system memory 2111 of the server 21 controlled by the operation system.

3. Encode 2113: to capture the raw images in the system memory 211 controlled by the operation system and further to forward these raw images to a hardware or software encoders for further encoding and streaming.

4. Stream 2113: to capture the streamed data from the encoder and to forward the streamed data to the respective distant client 91 through the network facilities 24.

As shown in FIG. 2, each of the servers 21 and 22 of the cloud based service system 2 can provide services simultaneously to plural clients 91, 92 and 93. However, for storing the raw image into the system memory 2111 and encoding the raw images need to consume the work capacity of the CPU of the respective server and also for the transmission of the raw images between the system memory 2111 and the video RAM (VRAM) will occupy a considerable range of bus bandwidths, huge operation loads would be inevitable to the servers 21 and 22, and to limit the number of the clients that can be served at the same time by a single server. Also, tremendous power consumption therein can be expected.

SUMMARY OF INVENTION

Accordingly, it is the primary object of the present invention to provide a system and a corresponding method that can enhance performance of an interact-able content browsing (ICB) service by leveraging GPU resources. Thereby, the number of clients that can be served simultaneously by a single server can be increased, and also energy consumption of the system can be substantially reduced.

According to the present invention, the system and the method of leveraging GPU resources to enhance performance of the interact-able content browsing service are to utilize the computation capacity of the GPU of the graphics card to share the computation load originally taken by the CPU. Thereby, the raw images depicted by the browser application program executed in the server can be directly retrieved from the VRAM of the graphics card by the encoder inside the GPU to be further encoded and streamed before being forwarded to distant clients. Upon such an arrangement, work load and bus bandwidth occupation on the CPU can be greatly reduced, the number of clients that can be served simultaneously by a single server can be increased, and the related power consumption can be substantially reduced.

In a preferable embodiment of the present invention, the system of leveraging GPU resources to enhance performance of the interact-able content browsing service can include at least a network facilities and at least a server. At least one client can use a network environment to capture a specific content of the system. The network facilities are to wirely or wirelessly connect with the network environment. The server is connected wirely or wirelessly to the network facilities. The network facilities can use the network environment to establish connection between the client and the server. In this embodiment, each server includes a CPU module and at least a graphics card.

The CPU module can further include a CPU to performing an OS and to execute at least an application program under the OS. Each of the application programs can form a respective application runtime environment for the corresponding one client to establish network connection and to make a capture request through the application runtime environment.

The graphics card can include individually a VRAM and at least a GPU based encoder. Each of the GPU based encoders is correspondence to an application runtime environment. The application runtime environment can generate at least a raw image to be stored into the VRAM. According to the capture request from the client, the corresponding GPU based encoder is to retrieve the corresponding raw image from the VRAM and to encode and stream the raw image for further forwarding to the respective client.

In one embodiment of the present invention, the capture request can be the request of the connected client to obtain the raw image generated by the application runtime environment for a further browsing purpose at the client end. The application runtime environment can accordingly to generate an application program interface (API) redirecting event. The respective GPU based encoder can accord to the API redirecting event to retrieve the correspondent raw image from the VRAM for further encoding, streaming and computing.

In one embodiment of the present invention, the content of the request can be a content of the interact-able content browsing service (ICB), and can be a webpage shown at the client end. The webpage definitely includes the raw image.

In one embodiment of the present invention, the OS can be one of the following: Windows XP, Windows Vista, and Windows 7.

In one embodiment of the present invention, the network environment can be one of the following: an internet environment, a telephone communication network environment, and a cable television network environment.

In one embodiment of the present invention, the client end capable of network connection can be one of the following: a computer, a PDA, a mobile phone, a game station, and a set-top box.

All these objects are achieved by the system and the method of leveraging GPU resources to enhance performance of an interact-able content browsing service described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a system and a method of leveraging GPU resources to enhance performance of an interact-able content browsing service. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the system and the method of leveraging GPU resources to enhance performance of the interact-able content browsing service are to utilize the computation capacity of the GPUs of the graphics card to share the computation load originally taken by the CPU. Thereby, the raw images depicted by the browser application program executed in the server can be directly retrieved from the VRAM of the graphics card by the encoder inside the GPU to be further encoded and streamed before being forwarded directly to distant clients. Upon such an arrangement, work load and bus bandwidth occupation on the CPU can be greatly reduced, the number of clients that can be served simultaneously by a single server can be increased, and the related power consumption can be substantially reduced.

Figure 1:
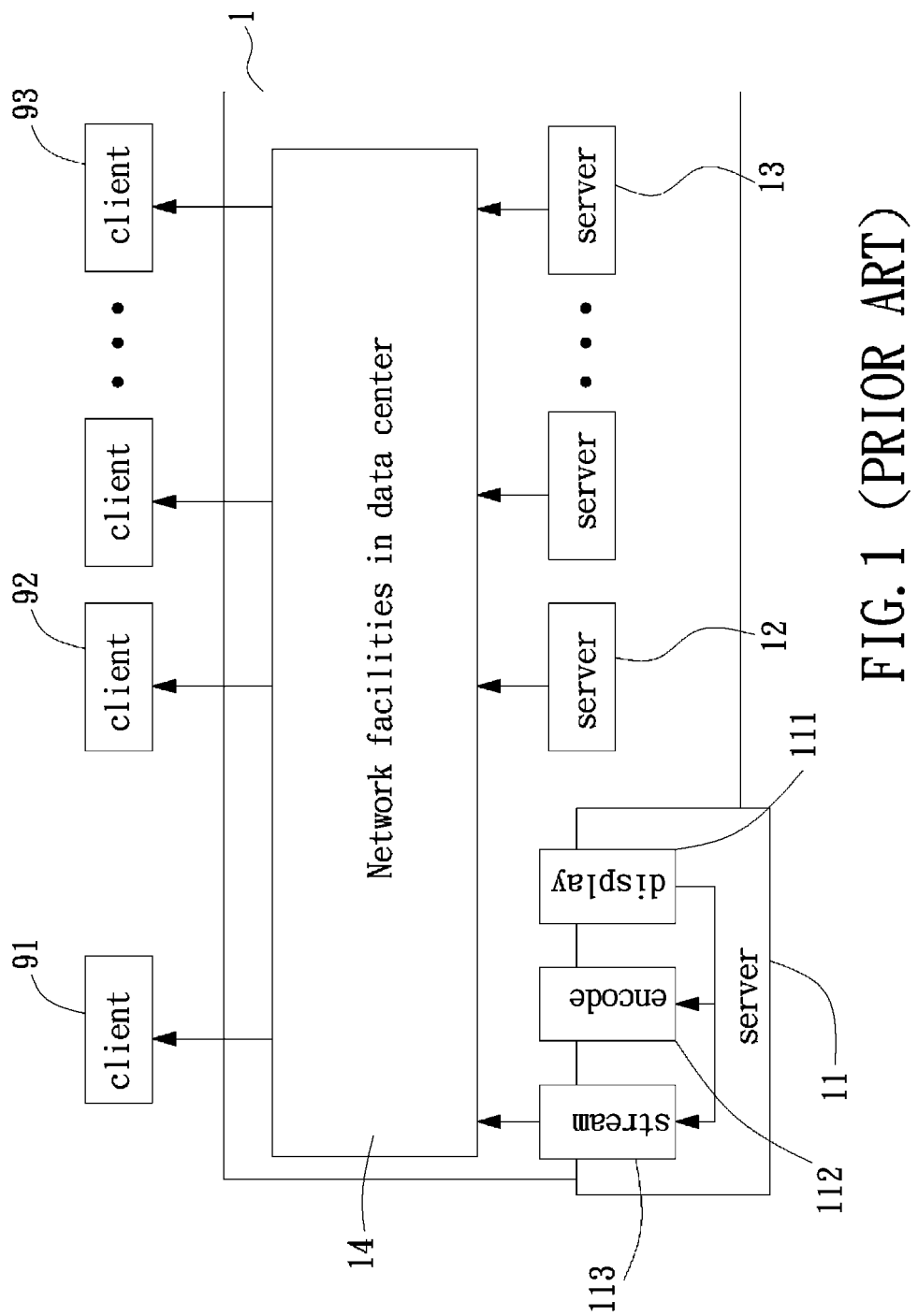
FIG. 1 shows a typical example of a conventional cloud based service system.
Figure 2:
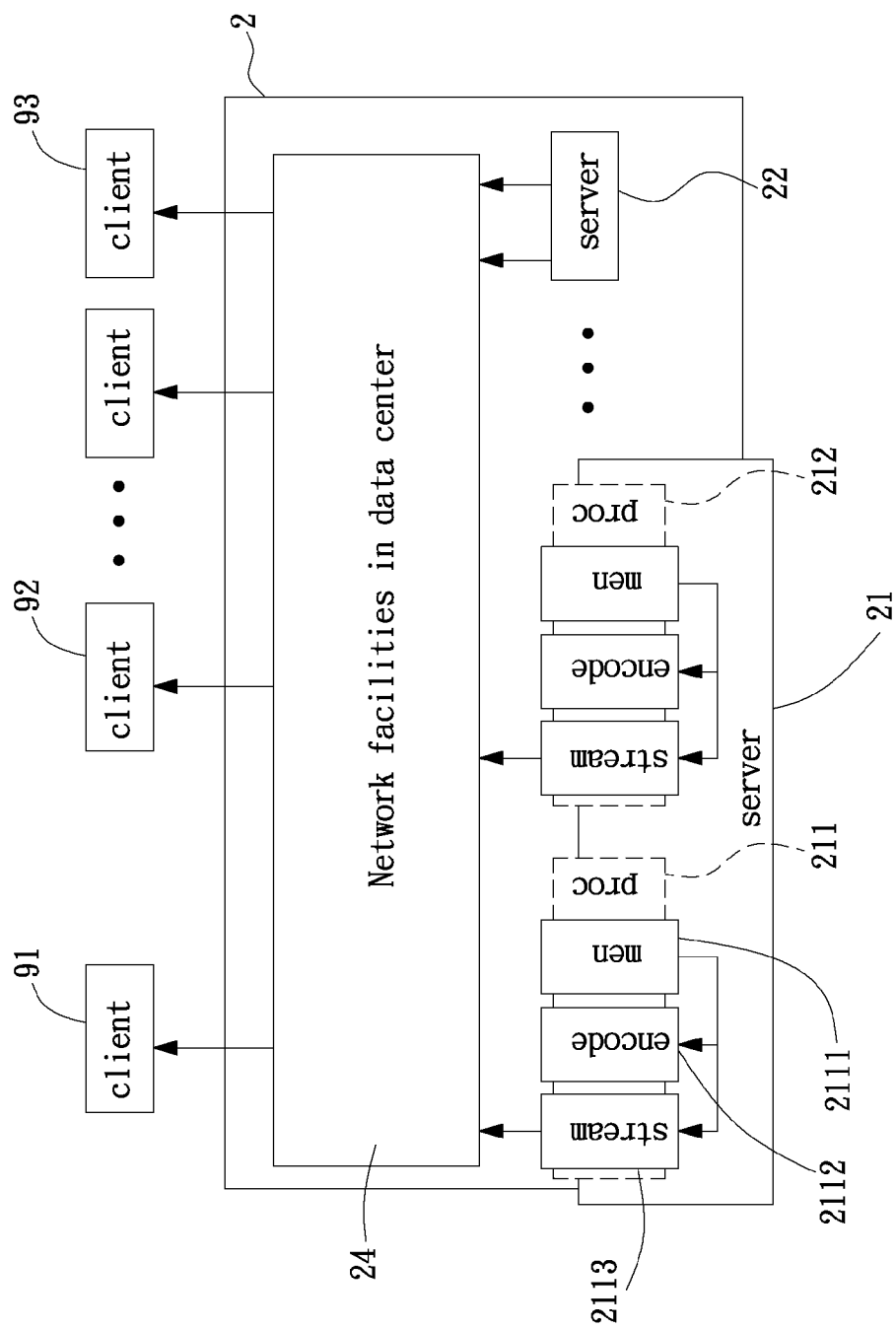
FIG. 2 shows another conventional cloud based service system.
Figure 3:
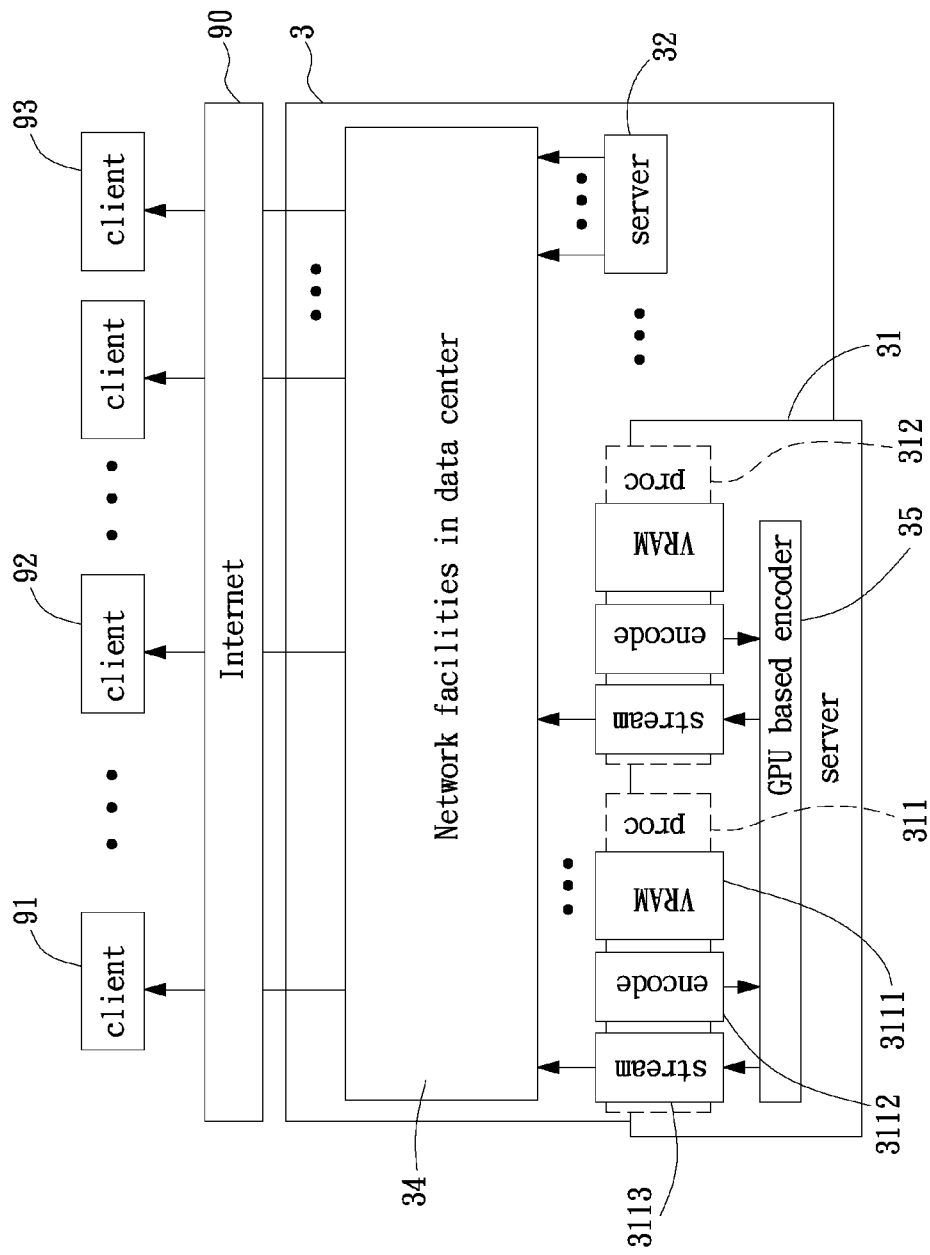
FIG. 3 shows a structure of an embodiment of the system of leveraging GPU resources to enhance performance of an interact-able content browsing service in accordance with the present invention.
Figure 4:
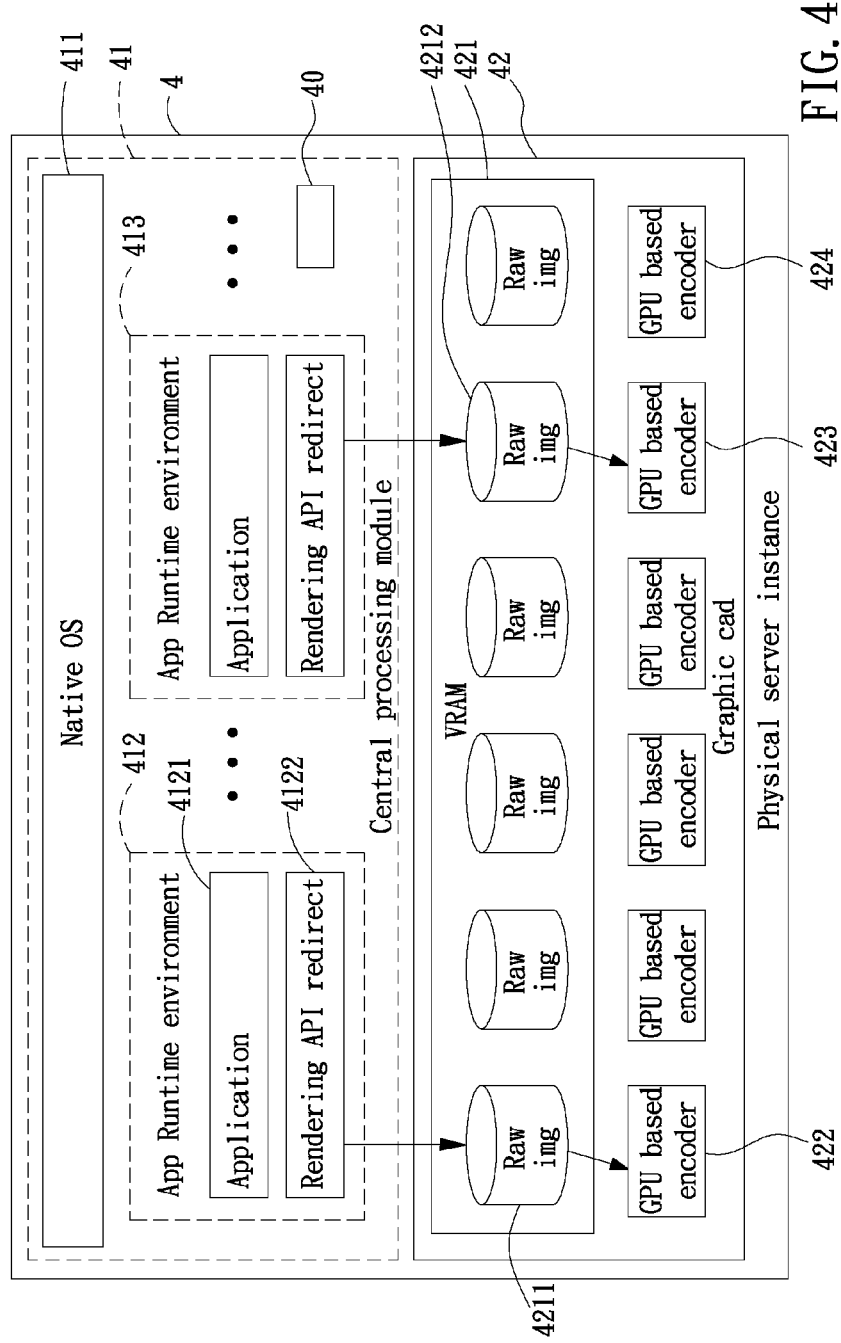
FIG. 4 details one of the servers of FIG. 3.

Referring now to FIG. 3 and FIG. 4, FIG. 3 shows a structure of an embodiment of the system of leveraging GPU resources to enhance performance of an interact-able content browsing service in accordance with the present invention, and FIG. 4 shows details of a server in FIG. 3.

As shown in FIG. 3, the system of leveraging GPU resources to enhance performance of the interact-able content browsing service 3 in accordance with the present invention can provide at least a client (plural clients 91, 92, and 93 in FIG. 3) to utilize a network environment 90 for establishing connection with the system 3 and for further obtaining services from the system 3. For example, but not limited to the example, a content of the system 3 can be captured and displayed at correspondent displayers at client ends 91, 92 and 93. The network environment 90 can be one of the following: an internet environment, a cable television network environment, and a telephone communication network environment, in which the telephone communication network environment can be, but not limited to, a global system for mobile communication (GSM), a general packet radio service (GPRS), a code division multiple access (CDMA) or any the like. In the present invention, the clients 91, 92, 93 can be broadly explained as any electronic device that can connect with the network environment 90 (any of the internet environment, the cable television network environment and the telephone communication network environment). The electronic device can be one of the following: a computer, a PDA, a mobile phone, a game station and a set-top box.

In one embodiment of the present invention, the system 3 of leveraging GPU resources to enhance performance of the interact-able content browsing service can include at least a network facilities 34 and at least a server 31, 32 (plural clients in general). The network facilities 34 are to wirely or wirelessly connect with the network environment 90. The network facilities 34 can use the network environment 90 to establish connection between the distant client 91, 92 or 93 and the server 31 or 32 so as to have the clients accessible to the cloud based service provided by the system 3. In the present invention, following descriptions elucidate how the servers 31, 32 of the system 3 is to provide the cloud based network applications and browsing service of a database center to the individual clients 91, 92 and 93.

1. Problem 311, 312: located in the server 31 for example to perform individually a plurality of application problems 311, 312 (these problems are not limited to browser application problem). Each of the problems 311, 312 can form a correspondent application runtime environment to be used by the distant clients 91, 92 to obtain the service of the same server 31 through the network facilities 34. Such services are not limited download of web pages and the browsing service.

2. VRAM 3111: to use the application runtime environments formed by performing the corresponding application programs 311 to sketch visional a series of raw image contents that can be displayed in a display peripheral and further to store the raw images into the VRAM 3111 of the graphics card. In this operation, every element of the first raw image would be written into the VRAM 3111. Thereafter, for the following raw images, only those elements that are different to those of the previous raw image would be written into the VRAM 3111.

3. Encode 3112: to utilize the GPU based encoder or GPU encoder on the graphics card to retrieve the raw images from the VRAM 3111 controlled by the graphics card and to further encode and stream the retrieved raw images.

4. Stream 3113: to capture the data stream 3113 from the VRAM 3111, and to transfer these data stream 3113 to the distant clients 91 via the network facilities 34, such that these raw images can be shown to the displays of the clients 91 in a webpage form. In the present invention, the webpage-formed raw images are not limited to be displayed by a browser such like "Internet Explorer" developed by Microsoft, but also can be displayed by any other means which are capable of showing visual contents (such as raw images) retrieved from Internet onto the display device of the client 91.

For the sketching or reforming of the raw images can be triggered by instant changes in the states or arrangements of specific elements, therefore in the serial operation of reforming the raw images, only the new matters shall be updated to the original images, it is not required to retrieve the total raw images from the system memory of the server 31 to the VRAM 3111. Upon such an arrangement, the data volume written to the memory can be reduced, the need or importance of the CPU of the server 31 can be reduced, and the processing efficiency can be increased. When there is a need to encode the raw images, the GPU encoder would capture the stored raw images from the VRAM 3111 and then the raw images are encoded and forwarded in a stream form. Obviously, such an operation won't occupy additional bus bandwidths in the server 31 and also won't increase the work load on the CPU of the server 31. Hence, by compared to the prior art, the system and the method of leveraging GPU resources to enhance performance of an interact-able content service in accordance with the present invention has the following advantages.

1. Every server 31 or 32 can execute more applications 311 and 312 at the same time without sacrificing the service efficiency, for the method of the present invention won't forward the output of the display peripherals to the software or hardware encoder controlled by the OS of the server 31 and 32.

2. Every server 31 or 32 can provide quality service capacity to more clients 91, 92 and 93 at the same time. Thus, the consumption in the bus bandwidths can be greatly reduced.

3. A higher work efficiency can be achieved by using the GPU encoder 35 inside the graphics card to encode the raw images.

4. Energy consumption of the server 31 and 32 for the comparable levels of jobs can be substantially decreased.

As shown in FIG. 4, the server 4 (the same structure as the server of FIG. 3) can include at least a CPU module 41 and at least a graphics card 42.

The CPU module 41 can further include a CPU 40 to performing an OS 411 and to execute at least an application program 4121 (preferably to be plural programs) under the OS 411. The CPU 40 controls the OS 411 and the application programs 4121 to work together in performing the processing of the video images and audio data. Each of the application programs 4121 can form a respective application runtime environment 412 or 413 for the corresponding one distant client to establish network connection and to make a capture request through the application runtime environment. The connected client can use the application runtime environment 412 or 413 to make a capture request for capturing a content from the server 4. Each of the graphics cards 42 can include individually a VRAM 421 and at least a GPU based encoder (or say, GPU encoder) 422, 423 and 424 (preferably to be plural). Each of the application runtime environments 412 and 413 is respective to one of the GPU encoders 422 and 423. Each of the application runtime environments 412 and 413 can generate at least one respective raw image 4211 or 4212 to be stored into the VRAM 421. According to the capture request from the client, the corresponding GPU encoder 422 is to retrieve the corresponding raw image 4211 from the VRAM 421 and to encode in a predetermined format and stream the raw image 4211 for further forwarding to the respective client.

In the embodiment, the OS 411 can be preferably (but not limited to) a native OS, such a Windows XP, a Windows Vista, and a Windows 7. Further, the captured content of the client from the server 4 can be a content of an interact-able content browsing service (ICB), in which the content can be shown to the browser of the client in a webpage form and the webpage includes the raw image 4211. In the present invention, services provided by the ICB system are not merely to allow clients to retrieve video files (or image streams) from the servers and to display the same on the clients. Contrary, users of the clients can control and change the ICB contents interactively. Taking on-line game as an example, the game program executed in the client end does not draw nor generate the raw images by itself, in stead, the game program monitors the signals coming from the input peripherals (such as mouse, arrow or control keys, or touch panel) and then transform these operational signals into control messages, and then sends these control messages to the server remotely located in the ICB system. The server then draws and generates those raw images based on the control messages, encodes the raw images into streams, and then sends back to the client for display. Therefore, the raw images shown on the display device of the client actually will change according to the operation signals coming from the input peripheral of client. Such that, although the user of client might feel these raw images are generated by the client, but in fact they are generated by the ICB system remotely, and thus the loading of the client can be significantly reduced.

In this embodiment, the capture request can be the request of the connected client to obtain the raw image 4211 generated by the application runtime environment 412 for a further browsing purpose at the client end. The application runtime environment 412 can accord to the capture request to generate an application program interface (API) redirecting event 4122. The respective GPU encoder 422 can accord to the API redirecting event 4122 to retrieve the correspondent raw image 4211 from the VRAM 421 for further encoding and streaming before being forwarded to the client. In this operation, no encoding and streaming upon the raw image 4211 by the CPU 40 is needed, and also there is no need to transfer the raw image 4211 between the system memory and the VRAM 421, so that the occupation problem in bus bandwidths can be resolved.

In the following listing, an example shows a program listing or source codes for details of how the present invention at a moment of locating an API redirecting event can react to introduce GPU encoder to retrieve raw images from the VRAM and to further encode and stream the raw images. Please note that, although the following codes are coded based on nVidia CUDA, but they are not limited to this example; for the following commands of the source codes can be understood to the skill person in the art, details of the codes would be omitted herein.

```
// create NV encoder
if((hr = NVCreateEncoder(&m_hEncoder1)) != S_OK)
{
m_pDebugPinOut->ShowLog(LL_Error, __FUNCTION__, __LINE__, "NVCreateEncoder1 fail: %d!\n", hr);
    m_nIsFinish=true;
    return S_FALSE;
}
// pop context
if((hr = cuCtxCreate(&m_hContext, 0, m_hDevice)) != CUDA_SUCCESS)
{
    m_pDebugPinOut->ShowLog(LL_Error, __FUNCTION__, __LINE__, "cuCtxCreate: %d\n", hr);
    return E_FAIL;
}
// allocate video memory
hr = cuMemAlloc((CUdeviceptr *)(&m_pDeviceYUVBuffer), m_nDstWidth*m_nDstHeight*3/2);
    if((hr = cuCtxPopCurrent(&m_hContext)) != CUDA_SUCCESS)
    {
        m_pDebugPinOut->ShowLog(LL_Error, __FUNCTION__, __LINE__, "cuCtxPopCurrent: %d\n", hr);
        return E_FAIL;
    }
// create lock
if((hr = cuvidCtxLockCreate(&m_nvveLock, m_hContext)) != CUDA_SUCCESS)
{
    m_pDebugPinOut->ShowLog(LL_Error, __FUNCTION__, __LINE__, "cuvidCtxLockCreate: %d\n", hr);
    return E_FAIL;
}
// set encoding parameters
if(FAILED(SetEncodeParam(m_hEncoder1, accu_in->m_nWidth, accu_in->m_nHeight)))
{
m_pDebugPinOut->ShowLog(LL_Error, __FUNCTION__, __LINE__, "SetEncodeParam for m_hEncoder1 fail!\n");
    m_nIsFinish=true;
    return S_FALSE;
}
    m_pDebugPinOut->ShowLog(LL_Debug, __FUNCTION__, __LINE__, "NVVE_DEVICE_MEMORY_INPUT ok\n");
    HRESULT hrRet = S_OK;
    if((hrRet = NVSetParamValue(m_hEncoder, NVVE_DEVICE_CTX_LOCK, &m_nvveLock)) != S_OK)
    {
        m_pDebugPinOut->ShowLog(LL_Error, __FUNCTION__, __LINE__, "NVVE_DEVICE_CTX_LOCK: %d\n", hrRet);
        return E_FAIL;
    }
    m_nDeviceMemPitch = m_nDstWidth;
    if(NVSetParamValue(m_hEncoder, NVVE_DEVICE_MEMORY_INPUT, &m_nUseDeviceMem) != S_OK)
    {
        ShowMessage("NVVE_DEVICE_MEMORY_INPUT fail!");
        m_nUseDeviceMem = 0;
    }
    NVCreateHWEncoder(m_hEncoder);
    m_encParam.picBuf = NULL; // Must be set to NULL in order to support device memory input
    hr = NVEncodeFrame(m_hEncoder, &m_encParam, 0, (void *)m_pDeviceYUVBuffer); //send the video
```

Figure 5:
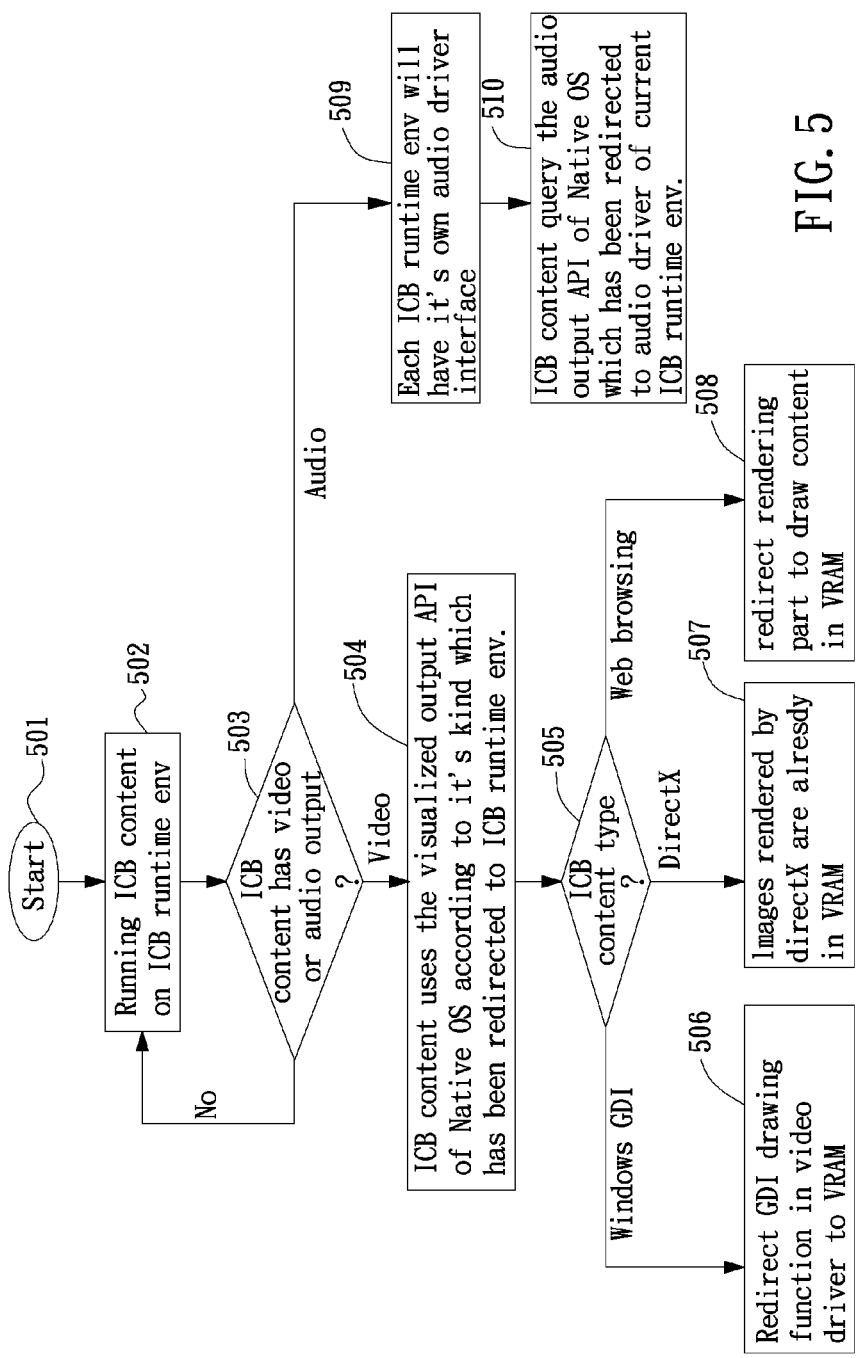
FIG. 5 is a flowchart of an embodiment showing operations at server end of the ICB under a performing environment in accordance with the present invention.

Referring now to FIG. 5, a flowchart of an embodiment showing operations at server end of the ICB under a performing environment in accordance with the present invention is illustrated. The operations include the following steps.

Step 501: Start.

Step 502: The ICB service of the present invention is to operate under an environment of executing the OS (not limited to Window systems) of a server, and an ICB application program is executed to form an ICB runtime environment for providing the distant clients to establish network connection and to capture the ICB content service. Then, go to Step 503

Step 503: Check if the ICB content to be captured by the client has video or audio output? If including the video output, go to Step 504. If including the audio output, go to Step 509. If including none of the video and audio output, go back to Step 502 for waiting a next capture request of the ICB content.

Step 504: The ICB content uses the visualized output API of the native OS according to the type of the ICB content, in which the type of the ICB content is determined in Step 505.

Step 505: Determine the type of the ICB content. If the ICB content is a video of Windows GDI, go to Step 506. If the ICB content is a video of DirectX, go to Step 507. If the ICB content is a video for web browsing, go to Step 508.

Step 506: Redirecting the GDI drawing function in video driver to the VRAM.

Step 507: Images rendered by DirectX are already stored in the VRAM.

Step 508: Redirect and supply the drawing content of the VRAM.

Step 509: Every ICB runtime environment has its own audio driver interface determined by Step 510.

Step 510: The ICB content queries to redirect the audio output API of the native OS to the corresponding audio driver under the current ICB runtime environment.

Figure 6:
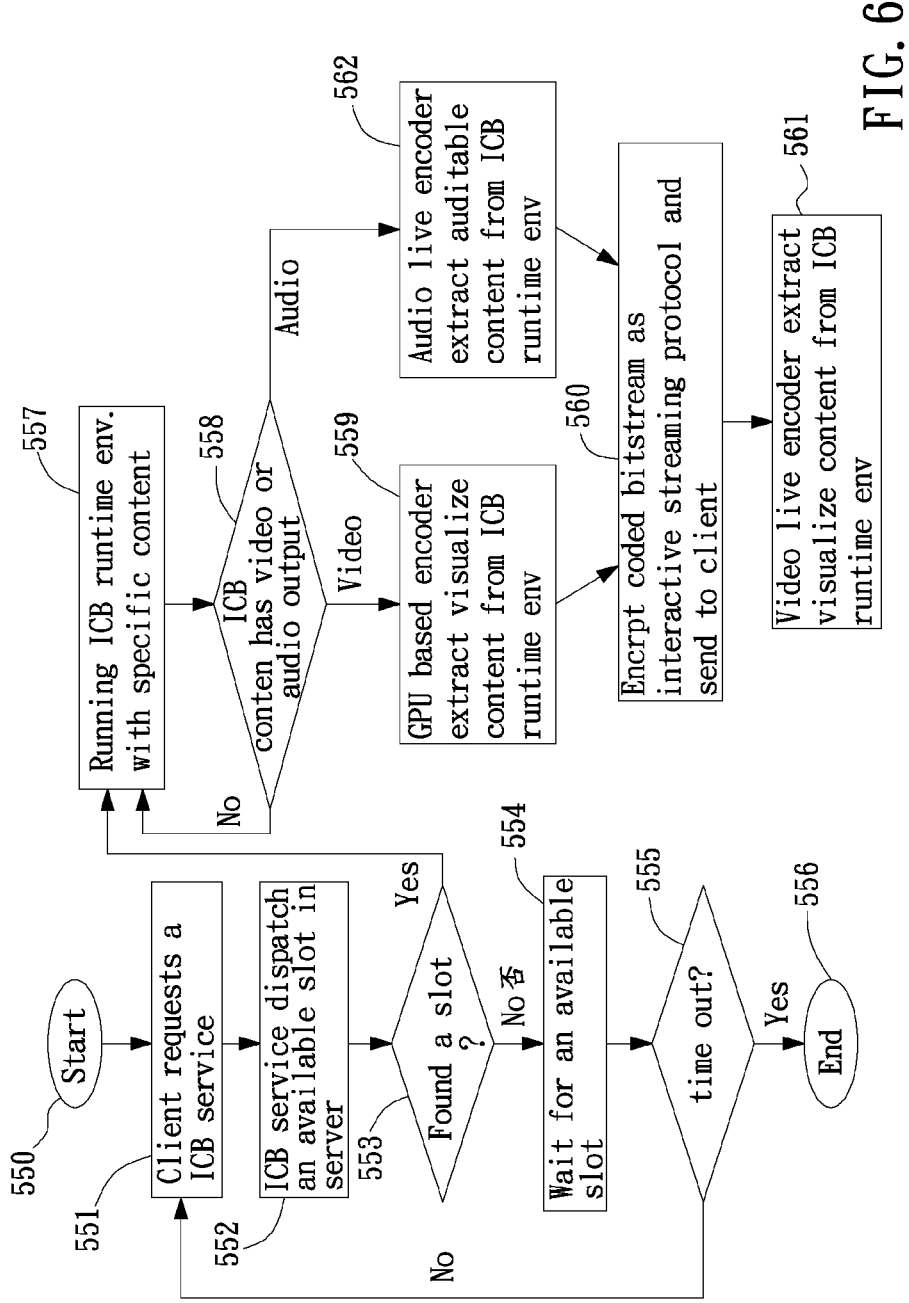
FIG. 6 is a flowchart of an embodiment of the method of leveraging GPU resources to enhance performance of an interact-able content browsing service at system end in accordance with the present invention.

Referring now to FIG. 6, a flowchart is provided to show an embodiment of the method of leveraging GPU resources to enhance performance of an interact-able content browsing service at system end in accordance with the present invention. The method includes the following steps.

Step 550: Start.

Step 551: The system of leveraging GPU resources to enhance performance of an interact-able content browsing service in accordance with the present invention receives an ICB service request from a client end. Go to Step 552.

Step 552: The ICB service dispatches an available slot in the server to the client end. Go to Step 553.

Step 553: Check if an available slot can be located. If positive, go to Step 557. If negative, go to Step 554.

Step 554: Wait for the available slot, and then go Step 555.

Step 555: Check if meets a timeout. If positive, go to Step 556. If negative, go back to Step 551.

Step 556: The end.

Step 557: Execute the ICB runtime environment with a specific content, and then go to Step 558.

Step 558: Check if the ICB content has video or audio output? If including the video output, go to Step 559. If including the audio output, go to Step 562. If including none of the video and audio output, go back to Step 557.

Step 559: The GPU encoder extracts the visualized content from the ICB runtime environment. Go to Step 560.

Step 560: According to an interactive streaming protocol, the ICB content is encoded and streamed, and encrypt the coded bitstream (the encoded stream) to the client end.

Step 561: A video live encoder extracts the visualized content from the ICB runtime environment.

Step 562: An audio live encoder extracts the auditable content from the ICB runtime environment. Go to Step 560.

Figure 7:
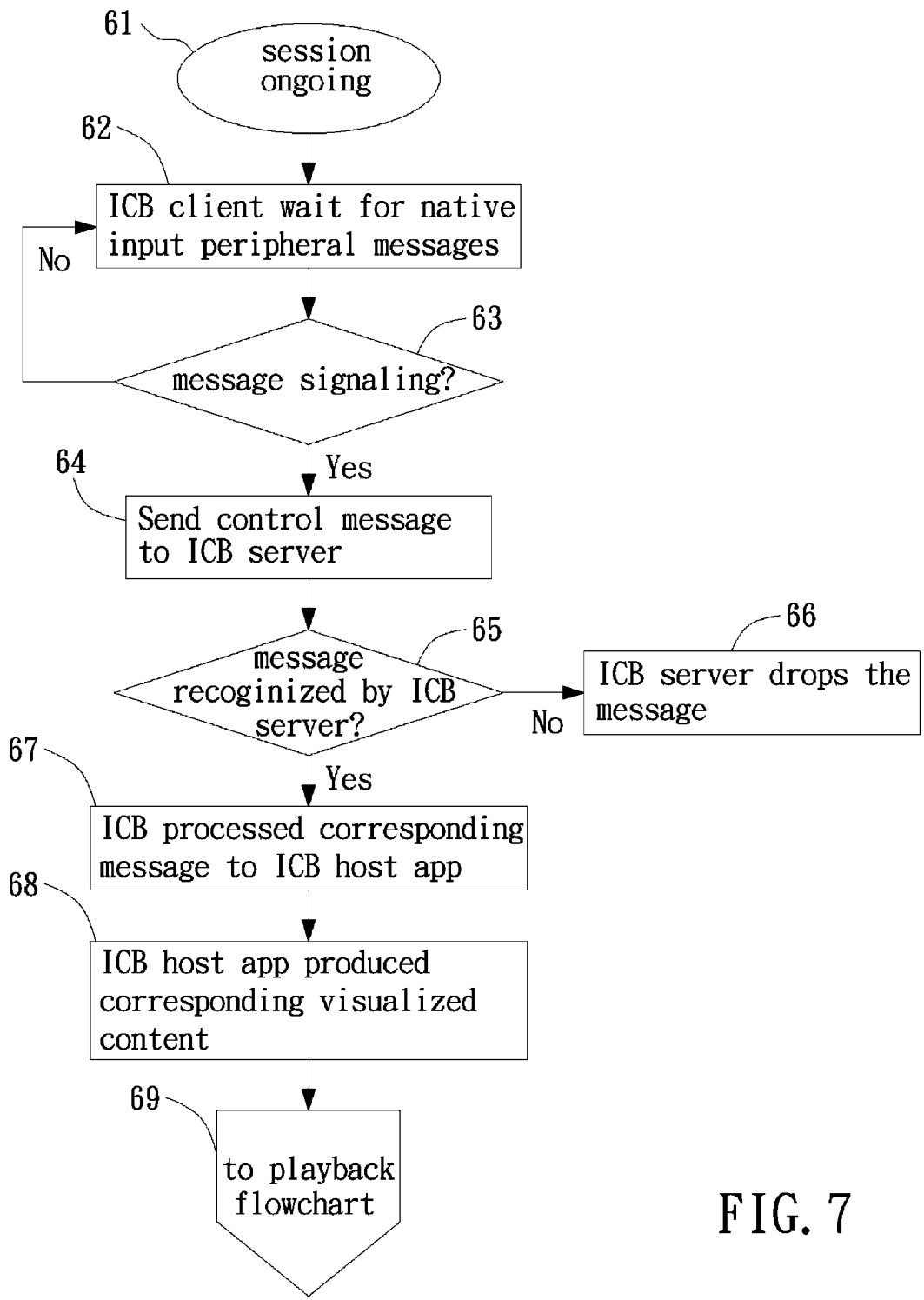
FIG. 7 is a flowchart of an embodiment showing operations at client end of the method of leveraging GPU resources to enhance performance of an interact-able content browsing service in accordance with the present invention.

Referring now to FIG. 7, a flowchart is provided to show an embodiment showing operations at client end in accordance with the present invention. The flowchart includes the following steps.

Step 61: Session ongoing. The client continuously executes a client application program in order to allow the client to connect to the ICB system, connect and use the runtime environment generated by one of the ICB application programs executed in one of the servers in the system, and retrieve the raw images encoded and streamed by one of the video cards inside the used server.

Step 62: The client that is connected to the ICB system waits for operation signals from its native input peripheral (such like but not limited to: mouse, arrow or functional keys, or touch panel) and transforms these operation signals into corresponding control messages.

Step 63: To check if there is any operation signals? If "NO", then go back step 62. If "YES", then proceed step 64.

Step 64: To send the control messages of the client to the server located in the ICB system.

Step 65: The server inside the ICB system checks if the control messages can be recognized? If "NO", then the server drops the control messages and then go back to step 62. If "YES", then proceed step 67.

Step 66: The server of ICB system processes corresponding control messages and send these control messages to the corresponding application runtime environment generated by the application program executed by that server.

Step 67: The application runtime environment generated in the server of ICB system generates corresponding visualized content (such as raw image) based on the control messages.

Step 68: Go to the playback flowchart as shown in FIG. 8.

Figure 8:
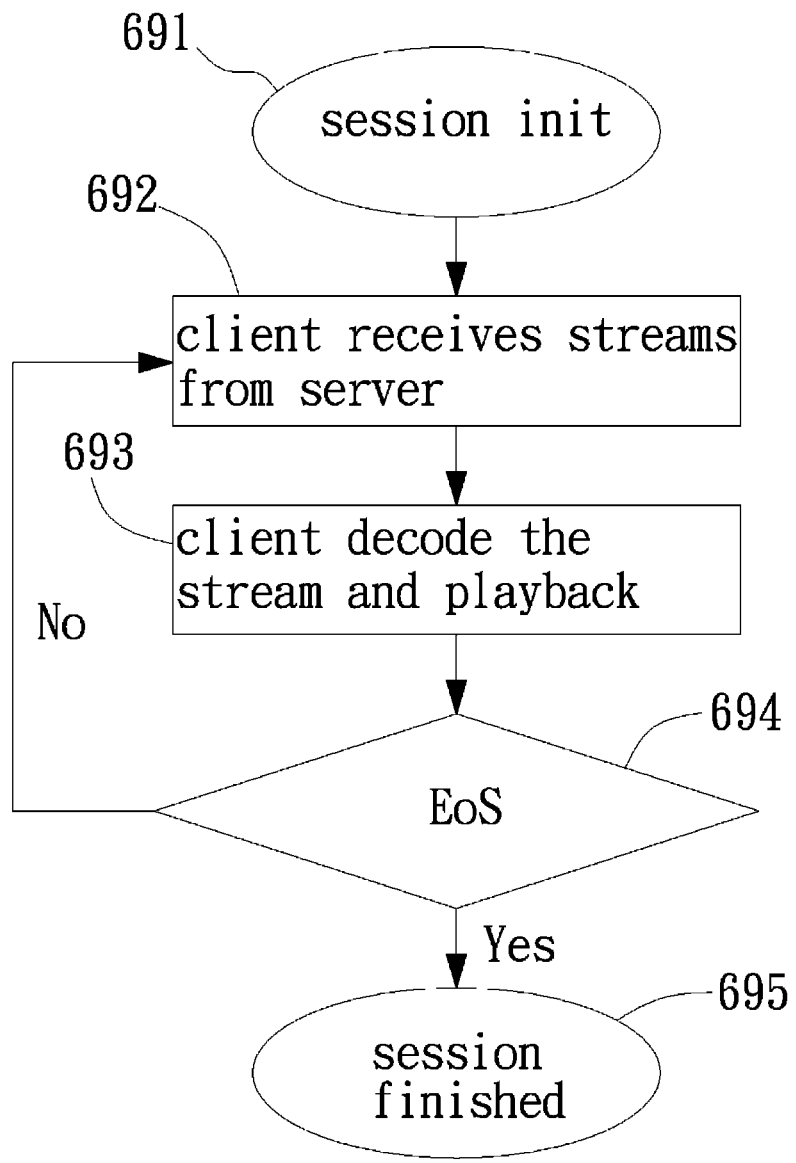
FIG. 8 is a flowchart of an embodiment of the playback procedures at client end of the ICB system in accordance with the present invention.

Referring now to FIG. 8, which is a flowchart of an embodiment of the playback procedures at client end of the ICB system in accordance with the present invention. The flowchart includes the following steps.

Step 691: Initiate the playback session at the client.

Step 692: The client receives the encoded streams of raw images from the server remotely located inside the ICB system.

Step 693: The Client decodes the streams and playback (show) to the display device of the client.

Step 694: To detect if an End-of-Session (EoS) signal is existing? If "NO", then go back to step 692. If "YES", then proceed step 695 in order to finish the playback session.

While the present invention has been particularly shown and described with reference to a preferred embodiment, it will be understood by those skilled in the art that various changes in form and detail may be without departing from the spirit and scope of the present invention.

What is claimed is:

1. A method of leveraging graphics processing unit (GPU) resources to enhance performance of an interact-able content browsing (ICB) service, applicable to a system including at least one server for providing at least one client to establish network connection and to capture a content through a network environment, the method comprising the steps of:

said at least one server executing at least one application program to form at least one runtime environment;

said at least one application runtime environment providing network connection to said at least one client, the network-connected client making a capture request through the respective application runtime environment, the respective application runtime environment generating at least one raw image to be stored in one VRAM of the server; and a GPU based encoder of the server according to the capture request to retrieve the corresponding raw image from the VRAM and to further encode and stream the raw image before being sent to the respective client;

wherein said content is an ICB content able to be displayed at said client in a webpage form including a webpage containing said raw image;

wherein said method further includes the steps of:

Step A: determining a type of said ICB content; going to Step B if said ICB content contains a video output, going to Step G if said ICB content contains an audio output, and waiting for a next capture request in said ICB content contains none of video and audio outputs;

Step B: said ICB content using a visualized output API of an OS according to a type of said ICB runtime environment, in which the type of said ICB runtime environment is determined in the following Step;

Step C: determine the type of said ICB runtime environment, performing Step D if the type is a video of Windows GDI, performing Step E if the type is a video of DirectX, and performing Step F if the type is a video for web browsing;

Step D: redirecting a GDI drawing function in a video driver to the VRAM;

Step E: images rendered by the DirectX being already stored in the VRAM;

Step F: redirecting and supplying the drawing content of the VRAM;

Step G: each said ICB runtime environment having its own audio driver interface determined by the following Step; and Step H: the ICB content querying to redirect an audio output API of the OS to a corresponding audio driver under the current ICB runtime environment.

2. The method of claim 1, wherein said capture request is a browsing request of the network-connected client asking to display said raw image generated by said application runtime environment; said application runtime environment according to said capture request to form a respective application program interface (API) redirecting event for retrieving said raw image from said VRAM and further encoding and streaming said raw image before being sent to the respective client; encoding and streaming upon said raw image being free of said GPU.

3. The method of claim 1, wherein said application runtime environment is to generate a serial of visualized raw images, every element of a first one of the visualized raw images being written into said VRAM, only elements of the rest of the visualized raw images that are different to those of a preceding one of the visualized raw images being written to said VRAM.

4. A method of leveraging graphics processing unit (GPU) resources to enhance performance of an interact-able content browsing (ICB) service, applicable to a system including at least one server for providing at least one client to establish network connection and to capture a content through a network environment, the method comprising the steps of:

said at least one server executing at least one application program to form at least one runtime environment, at least one said client being network connected with a respective one application runtime environment;

the application runtime environment generating at least one raw image to be stored in one VRAM of the server; and according an API redirecting event in response to a request from the network-connected client, a GPU based encoder of the server retrieving the corresponding raw image from the VRAM and to further encode and stream the raw image before being sent to the respective client;

wherein said content is an ICB content able to be displayed at said client in a webpage form including a webpage containing said raw image;

wherein said method further includes the steps of:

Step A: determining a type of said ICB content; going to Step B if said ICB content contains a video output, wing to Step G if said ICB content contains an audio output, and waiting for a next capture request in said ICB content contains none of video and audio outputs;

Step B: said ICB content using a visualized output API of an OS according to a type of said ICB runtime environment, in which the type of said ICB runtime environment is determined in the following Step;

Step C: determine the type of said ICB runtime environment, performing Step D if the type is a video of Windows GDI, performing Step E if the type is a video of DirectX, and performing Step F if the type is a video for web browsing;

Step D: redirecting a GDI drawing function in a video driver to the VRAM;

Step E: images rendered by the DirectX being already stored in the VRAM;

Step F: redirecting and supplying the drawing content of the VRAM;

Step G: each said ICB runtime environment having its own audio driver interface determined by the following Step; and Step H: the ICB content querying to redirect an audio output API of the OS to a corresponding audio driver under the current ICB runtime environment.

5. The method of claim 4, wherein said request is a browsing request of the network-connected client asking to display said raw image generated by said application runtime environment; said application runtime environment retrieving said raw image from said VRAM according to said API redirecting event and further encoding and streaming said raw image before being sent to the respective client; encoding and streaming upon said raw image being free of said GPU.

6. The method of claim 4, wherein said application runtime environment is to generate a serial of visualized raw images, every element of a first one of the visualized raw images being written into said VRAM, only elements of the rest of the visualized raw images that are different to those of a preceding one of the visualized raw images being written to said VRAM.

7. A method of leveraging graphics processing unit (GPU) resources to enhance performance of an interact-able content browsing (ICB) service, applicable to a system including at least one server for providing at least one client to establish network connection and to capture a content through a network environment, the method comprising the steps of:

said at least one server executing at least one application program to form at least one runtime environment;

said at least one application runtime environment providing network connection to said at least one client, the network-connected client making a capture request through the respective application runtime environment, the respective application runtime environment generating at least one raw image to be stored in one VRAM of the server; and a GPU based encoder of the server according to the capture request to retrieve the corresponding raw image from the VRAM and to further encode and stream the raw image before being sent to the respective client;

wherein said content is an ICB content able to be displayed at said client in a webpage form including a webpage containing said raw image;

wherein said method further includes the steps of:

Step a: executing an ICB runtime environment with a specific content;

Step b: checking if the ICB content has video or audio output; performing Step c if including the video output, performing Step f if including the audio output, and going back to perform Step a if including none of the video and audio output;

Step c: the GPU encoder extracting a visualized content from the ICB runtime environment;

Step d: according to an interactive streaming protocol to encode the ICB content into a stream form and to further send respective encoded stream to the client;

Step e: a video live encoder extracting the visualized content from the ICB runtime environment; and Step f: an audio live encoder extracting an auditable content from the ICB runtime environment, and then performing the Step d.

8. A method of leveraging graphics processing unit (GPU) resources to enhance performance of an interact-able content browsing (ICB) service, applicable to a system including at least one server for providing at least one client to establish network connection and to capture a content through a network environment, the method comprising the steps of:

said at least one server executing at least one application program to form at least one runtime environment, at least one said client being network connected with a respective one application runtime environment;

the application runtime environment generating at least one raw image to be stored in one VRAM of the server; and according an API redirecting event in response to a request from the network-connected client, a GPU based encoder of the server retrieving the corresponding raw image from the VRAM and to further encode and stream the raw image before being sent to the respective client;

wherein said content is an ICB content able to be displayed at said client in a webpage form including a webpage containing said raw image;

wherein said method further includes the steps of:

Step a: executing an ICB runtime environment with a specific content;

Step b: checking if the ICB content has video or audio output; performing Step c if including the video output, performing Step f if including the audio output, and going back to perform Step a if including none of the video and audio output;

Step c: the GPU encoder extracting a visualized content from the ICB runtime environment;

Step d: according to an interactive streaming protocol to encode the ICB content into a stream form and to further send respective encoded stream to the client;

Step e: a video live encoder extracting the visualized content from the ICB runtime environment; and Step f: an audio live encoder extracting an auditable content from the ICB runtime environment, and then performing the Step d.

* * * * *